Sept. 13, 1966  M. PLOKE  3,272,103

PHOTOELECTRIC MEASURING DEVICE

Filed Oct. 31, 1963 — 2 Sheets-Sheet 1

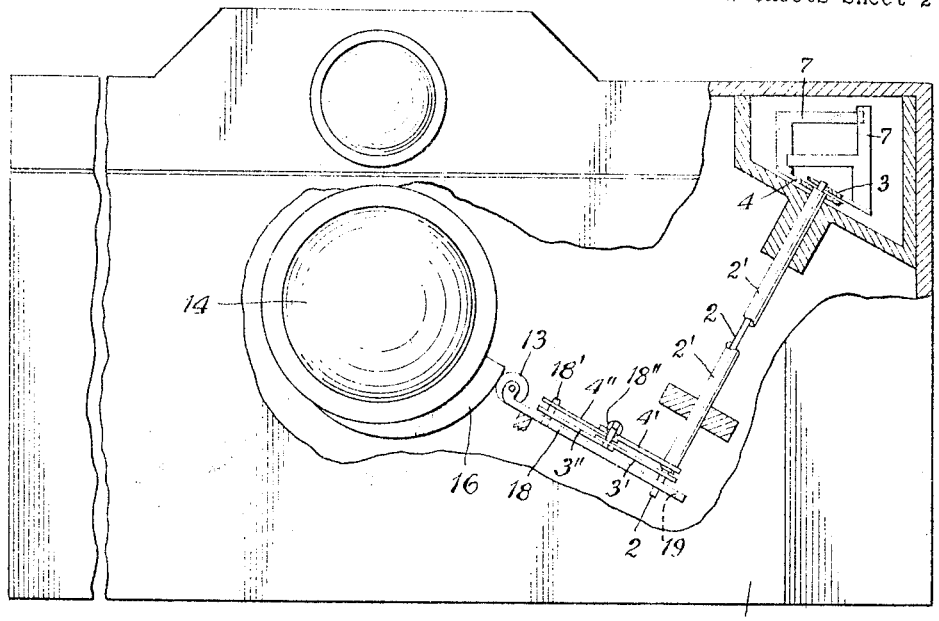

United States Patent Office 3,272,103
Patented Sept. 13, 1966

3,272,103
PHOTOELECTRIC MEASURING DEVICE
Martin Ploke, Kiel, Germany, assignor to Zeiss Ikon
Aktiengesellschaft, Stuttgart, Germany
Filed Oct. 31, 1963, Ser. No. 320,317
Claims priority, application Germany, Nov. 7, 1962,
Z 9,757
8 Claims. (Cl. 95—10)

The invention relates to an apparatus for photoelectric optometry by means of an objective arranged in front of the measuring area. Said objective is provided in its focal plane with a so-called field of vision diaphragm which is adjustable to different measuring angles.

This adjustable field of vision diaphragm serves for the purpose to adapt the measuring angle of the light measuring apparatus to different focal lengths of photographic objectives which selectively may be attached to the camera casing. Since the amount of light striking the measuring area, i.e. the photoelectric cell, is affected by the adjustable diaphragm arranged in front of it, the light measurement is influenced by and incorporates the value of the measuring angle used.

Thus, the present invention provides a unique and novel device for controlling the amount of light impinging on the light sensitive element or photo-cell in accordance with the optical characteristics of the interchangeable objectives employed on the camera. This can be compensated for by introducing resistances into the photocell circuit, which resistances are selected in dependence of the field of vision diaphragm used.

It is an object of the invention to overcome the disadvantages connected with such compensation circuits in that the adjustable diaphragm serving as the field of vision diaphragm is operatively connected with another adjustable diaphragm serving as an aperture diaphragm in such a manner that a change of one diaphragm aperture results in a change of the other diaphragm aperture in the sense that the illumination of the measuring area is always independent of the measuring angle, provided that the brightness of the object remains homogenous or uniform.

It is of advantage to connect the leaves of the field of vision diaphragm with the leaves of the aperture diaphragm by means of pivotally connected two-armed levers and with the pivot point positioned between the leaves in such a manner that an opening of one diaphragm results in the closing of the other diaphragm, and conversely.

If the axis of rotation of the two-armed levers is perpendicular to the motion of the diaphragm leaves, and rectangular diaphragm openings are used, then only a change in the width of the rectangular diaphragm apertures will take place while their height remains unchanged. The picture angle of an objective is always symmetrical to the optical axis. Consequently, a change of the picture angle does not entail a change of the side condition of rectangular diaphragm openings. In order to achieve this constancy for the diaphragm adjusting device according to the invention, the common axis of rotation of the two-armed levers is arranged perpendicularly to one of the diagonals of the rectangular diaphragm openings.

When the photoelectric measuring device of the invention is combined with a photographic camera, it is desirable that the limiting angle of the light measuring device corresponds to the picture angle of any one of the exchangeable objectives which may be used. This can be achieved in that the diaphragm adjusting device is coupled, for instance by means of a cam controlled device, with the particular exchangeable objective attached to the photographic camera.

If a pancratic objective is employed, analogously the device for adjusting the focal length of the same is coupled with the light measuring device. Furthermore, it may be of advantage to have the adjusted measuring angles indicated in the viewfinder or at the casing of the camera, possibly in opposition to the focal length indication of the attached objective, be it to verify the automatic adjustment or be it to manually adjust the measuring angle of the focal length of the objective used.

In order to concentrate all light passing the diaphragm aperture upon the measuring surface, i.e. the photoelectric cell or the photo resistance, the field of vision diaphragm is arranged in front of a light collecting means comprising, for instance, a mirror box or an aperture body which latter is adapted to direct additional reflected light onto the measuring surface.

The invention will now be described in more detail with reference to the accompanying drawings, in which FIG. 1 is a top view of a horizontal section of a photoelectric measuring device of the invention;

FIG. 3 is a rear elevation view of a photographic camera with parts broken away, provided with a light measuring device of the invention, and FIG. 4 illustrates diagrammatically a pancratic objective and its combination with a control lever device forming a part of the present invention.

Figure 1:
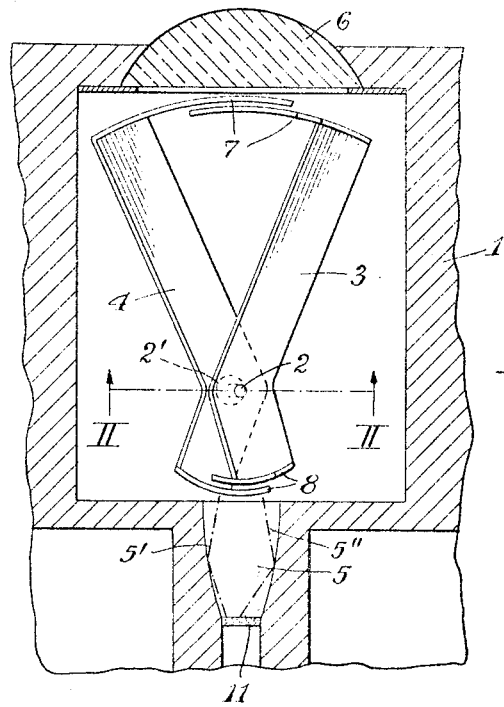

Referring to FIG. 1, a camera casing 1 has pivotally mounted therein about a common axis formed by the coaxial shafts 2 and 2' the double armed lever 3 and 4. These levers are arranged between an optical element 5 for changing the aperture and an objective lens 6. The levers 3 and 4 carry at their ends the leaves 7 and 8 which form adjustable diaphragms. Behind the optical element 5 is arranged a photo resistance 11 to be energized by light passing through the element 5.

The light measuring device includes a photo-sensitive element 11 such as a photo-cell or an electric resistor whose resistance varies with changes in the amount of light which impinges on the resistor as described in United States Patent 3,185,052, issued May 25, 1965.

Figure 2:
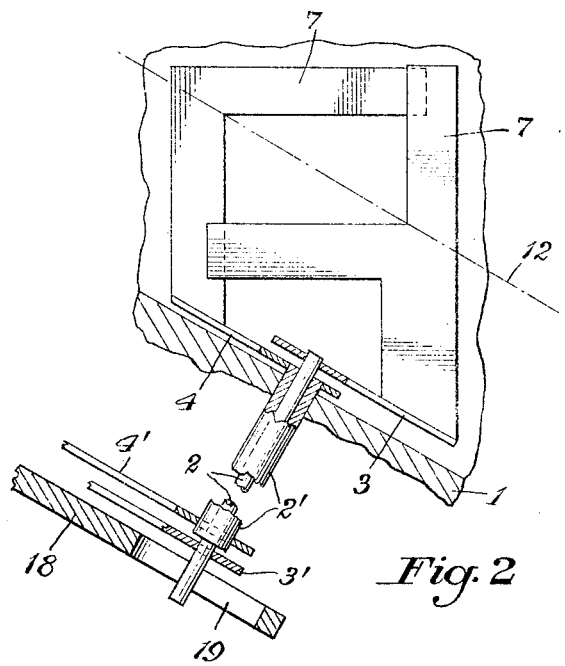
FIG. 2 is a sectional view along the line II—II of FIG. 1.

The shaft 2 is rotatably supported within the tubular shaft 2'. The shaft 2' is rotatably mounted within the camera casing 1 and carries fixedly at its upper end the double armed lever 3, while the shaft 2 which projects with both its ends from the ends of the tubular shaft 2', has fixedly attached thereto the other double armed lever 4. The axis of rotation of the two shafts 2 and 2', as shown in FIG. 2, is arranged at a right angle with respect to one of the diagonals 12 of the rectangular diaphragm aperture formed by the two pairs of overlapping leaves 7 and 8 respectively.

The lower ends of the shafts 2 and 2' have fixedly mounted thereon one end of the control levers 3' and 4', respectively. The other end of these control levers is pivotally connected at 9 and 10 to one end of similar control levers 3" and 4". The other ends of these control levers 3" and 4" are pivotally attached to a common pin 18' attached to a lengthwise slidably mounted bar 18 which extends parallel to the lever structure 3', 3", 4' and 4" and has as one end a slot 19 through which extends the lower end of the shaft 2. The other end of the bar 18 carries thereon a freely rotatable roller 13 which engages a cam 16 arranged on the circumference of the objective mount 21 of a camera objective, the optical axis of which is arranged at a right angle to the lengthwise movement of the bar 18 as particularly shown in FIGS. 3 and 4.

A coil spring 18" (FIG. 4) attached with its ends to the pivot pins 9 and 10 connecting the control levers 3', 3" and 4', 4" respectively, tends to pull the pairs of parallel lever arms toward each other. Upon a rotatable adjustment of the camera objective the cam 16 thereon causes a corresponding longitudinal displacement of the bar 18 and of the pivot pin 18' thereon. This in turn effects a rotative adjustment of the control levers 3' and 4' and of the shafts 2 and 2' and finally of the double-armed levers 3 and 4 and an adjustment of the rectangular areas formed between the pairs of leaves 7 and 8 respectively.

Each exchangeable camera objective 14 is provided with a differently shaped cam 16 depending upon the focal length of the objective 14.

Referring now to FIG. 4, the diagrammatically illustrated pancratic camera objective is provided with a knurled ring 20 for rotatably adjusting the exterior objective mount 21 on which the cam 16 is attached. When the objective mount 21 is rotatably adjusted, the result is that the negative lens 15' is axially displaced in conventional manner, in the present case by means of the slot and pin connection 22, 23. Each focal length corresponds to a predetermined position of the cam 16 which is transferred by the control lever device 3', 3'', 4', 4'', 18 to the diaphragm shafts 2 and 2' and by the latter to the levers 3 and 4 and the pairs of diaphragm leaves 7 and 8. The result is that the photo resistance is always energized by light having the same picture angle as the picture angle of the pancratic objective.

The optical element 5 for changing the aperture causes the light rays which pass through the two rectangular diaphragm apertures and which do not go directly to the photo resistance to be totally reflected on the walls of the optical member 5 so that these light rays will be directed additionally onto the photo resistance 11. In place of this optical element 5 which consists of a solid glass body, it would also be possible to employ reflecting surfaces, for instance an annular mirror body, which also would direct additional light rays to the photo resistance. In FIG. 1 are shown two such additional light rays 5' and 5''.

For measuring a light beam with the smallest measuring angle, the field of vision diaphragm 8 is set to its smallest aperture whereby at the same time the aperture diaphragm 7 is adjusted automatically to its largest aperture. If the measuring angle is increased, the aperture of the diaphragm 8 becomes larger so that more light passes through the aperture body 5 and from there onto the photo resistance 11. However, by the simultaneous decrease of the aperture of the diaphragm 7 this light increase is neutralized so that always the same light intensity impinges upon the photo resistance regardless of the different size of the measuring angle. A prerequisite is, of course, that the brightness of the object within the range of the measuring angle variation is at least approximately homogeneous or uniform.

What I claim is:

1. A device for photoelectric optometry including an objective arranged in front of a photoelectric measuring surface, an adjustable field of vision diaphragm (8) positioned in the focal plane of said objective, a second adjustable diaphragm (7) arranged in axially spaced relation from said first mentioned field of vision diaphragm, and means operatively connecting said two diaphragms with one another so that an adjustment of one of said diaphragms in one direction causes an adjustment of the other one of said diaphragms in the opposite direction, said operative connecting means comprising two double-armed levers with said adjustable field of vision diaphragms on one of the ends of said levers, and a second adjustable diaphragm on the other ends of said levers, means for pivotally connecting the same with one another between their ends, and diaphragm leaves at the ends of said levers and arranged to be moved in pairs in overlapping relation to form rectangular apertures between the same, whereby upon reduction of the size of one of the two apertures the other one of said two apertures increases in size.

2. A device for photoelectric optometry including an objective arranged in front of a photoelectric measuring surface, an adjustable field of vision diaphragm (8) positioned in the focal plane of said objective, a second adjustable diaphragm (7) arranged in axially spaced relation from said first mentioned field of vision diaphragm, and means operatively connecting said two diaphragms with one another so that an adjustment of one of said diaphragms in one direction causes an adjustment of the other one of said diaphragms in the opposite direction, said operative connecting means comprising two double-armed levers, means for pivotally connecting the same with one another between their ends, and diaphragm leaves at the ends of said levers and arranged to be moved in pairs in overlapping relation to form rectangular apertures between the same, whereby upon reduction of the size of one of the two apertures the other one of said two apertures increases in size, the pivot axis of said two levers being arranged at right angles to one of the diagonals of said rectangular diaphragm apertures.

3. The combination with a photographic camera arranged to have attached thereto any one of a number of exchangeable photographic objectives, of a device for photoelectrically measuring the light reflected by the subject to be photographed, said device including an objective arranged in front of a photoelectric measuring surface, an adjustable field of vision diaphragm (8) positioned in the focal plane of said objective, a second adjustable diaphragm (7) arranged in axially spaced relation from said first mentioned field of vision diaphragm, and two double-armed pivotally connected levers operatively connecting said two diaphragms with one another so that an adjustment of one of said diaphragms in one direction causes an adjustment of the other one of said diaphragms in the opposite direction; and means for operatively coupling the photographic objective attached to said camera with said two double-armed levers in such a manner that the focal length of said photographic objective corresponds to the measuring angle to which said device has been adjusted.

4. The combination with a pancratic objective having means for changing the focal length of the same, of a device for photoelectrically measuring the light reflected by the subject to be photographed by said pancratic objective, said device including an objective arranged in front of a photoelectric measuring surface, an adjustable field of vision diaphragm (8) positioned in the focal plane of said objective, a second adjustable diaphragm (7) arranged in axially spaced relation from said first mentioned field of vision diaphragm, and two double-armed pivotally connected levers operatively connecting said two diaphragms with one another so that an adjustment of one of said diaphragms in one direction causes an adjustment of the other one of said diaphragms in the opposite direction; and means for operatively coupling said means for changing said focal length with said two double-armed levers in such a manner that the picture angle corresponding to the adjusted focal length of said pancratic objective determines the measuring angle of said device.

5. A device for photoelectric optometry having an optical axis including an objective arranged in said optical axis in front of a photoelectric measuring surface, an adjustable field of vision diaphragm (8) positioned in the focal plane of said objective, a second adjustable diaphragm (7) arranged in axially spaced relation from said first mentioned field of vision diaphragm, two double-armed pivotally connected levers operatively connecting said two diaphragms with one another so that an adjustment of one of said diaphragms in one direction causes an adjustment of the other one of said diaphragms in the opposite direction, and light collecting optical means arranged in the area of said focal plane in front of said photoelectric measuring surface through which the measuring light rays pass before they reach said measuring surface.

6. A device according to claim 5, in which said light collecting optical means comprises a mirror chamber.

7. A device according to claim 5, in which said light collecting means comprises a solid glass body with totally reflecting side walls which direct reflected light rays toward said photoelectric measuring surface.

8. A device for photoelectric light measurement with an objective arranged in front of the measuring surface, an adjustable field of vision diaphragm positioned in the focal plane of said objective and adapted for different measuring angles, said field of vision diaphragm being operatively connected with a second adjustable diaphragm in such a manner that a change in aperture size of one diaphragm results in a corresponding change of the illumination of the measuring surface which is independent of the existing measuring angle, characterized in this, that the leaves of the field of vision diaphragm (8) are connected with the leaves of the other diaphragm (7) by means of a double-armed lever (3, 4) which have axes of rotation disposed between the leaves, said connection being of such a nature that the opening of one of the diaphragms results in a closing of the other diaphragm.

References Cited by the Examiner

UNITED STATES PATENTS

| 2,186,616 | 1/1940 | Mihalyi | 95—64 X |
| 2,448,220 | 8/1948 | Jenkins | 88—61 X |
| 3,185,052 | 5/1965 | Baron | 352—141 X |

FOREIGN PATENTS

| 1,295,852 | 5/1962 | France. |
| 1,297,683 | 5/1962 | France. |
| 893,886 | 4/1962 | Great Britain. |

NORTON ANSHER, *Primary Examiner.*

J. F. PETERS, JR., *Assistant Examiner.*